US006965076B2

(12) United States Patent
Wu

(10) Patent No.: US 6,965,076 B2
(45) Date of Patent: Nov. 15, 2005

(54) METHOD OF ASSEMBLY FOR MODULAR COMPUTER KEYBOARDS

(76) Inventor: Lee Hong Wu, 21055 Paseo Vereda, Lake Forest, CA (US) 92630

(*) Notice: Subject to any disclaimer, the term of this patent is extended or adjusted under 35 U.S.C. 154(b) by 121 days.

(21) Appl. No.: 10/180,423

(22) Filed: Jun. 26, 2002

(65) Prior Publication Data

US 2004/0000048 A1    Jan. 1, 2004

(51) Int. Cl.⁷ ............................................. H05K 5/06
(52) U.S. Cl. ................................... 174/52.2; 361/680
(58) Field of Search ..................... 29/622; 708/138, 708/141; 341/22; 361/680, 683; 395/168; 400/682, 691–693, 488, 489; 174/52.2

(56) References Cited

U.S. PATENT DOCUMENTS

| | | | | |
|---|---|---|---|---|
| 4,387,127 A | * | 6/1983 | Ogden | ....................... 428/42.3 |
| 5,144,302 A | * | 9/1992 | Carter et al. | .................. 341/20 |
| 5,150,118 A | * | 9/1992 | Finkle et al. | ................. 341/23 |
| 5,153,589 A | * | 10/1992 | Heys et al. | .................... 341/22 |
| 5,865,546 A | * | 2/1999 | Ganthier et al. | ............ 400/489 |
| 5,966,284 A | * | 10/1999 | Youn et al. | ................. 361/680 |
| 5,969,644 A | * | 10/1999 | Koutaka | ...................... 341/22 |

* cited by examiner

Primary Examiner—Hung V. Ngo
(74) Attorney, Agent, or Firm—Jen-Feng Lee

(57) ABSTRACT

A modular computer keyboard assembly that separates keyboard components into two groups. One group of components becomes a detachable module, while the other group stays as the base module. Depending on applications, the detachable module can be further broken into more sub-modules. Keyboards manufactured following the method proposed by present invention are modular in nature, and are conducive to reducing the costs for keyboard services and exchanges, costs for curing future environmental hazards and costs for fitting suitable user keycaps for swapping among different languages and computer applications.

8 Claims, 16 Drawing Sheets

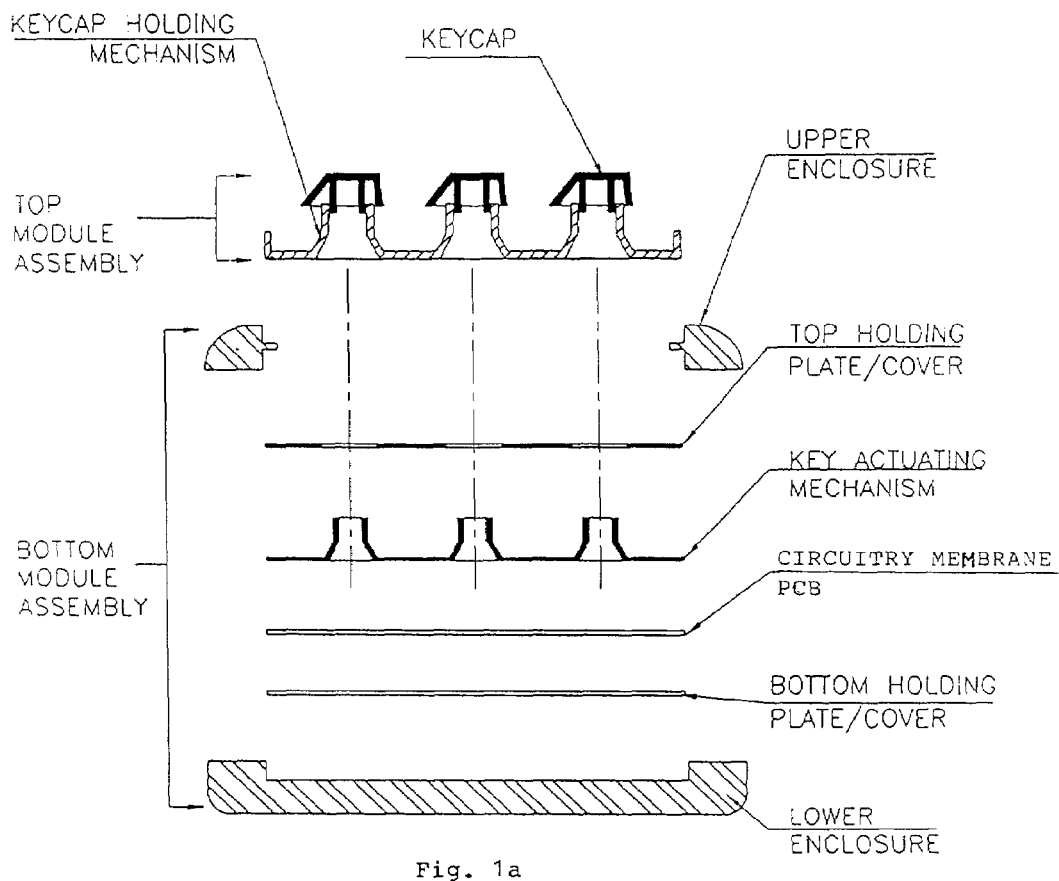
Fig. 1a
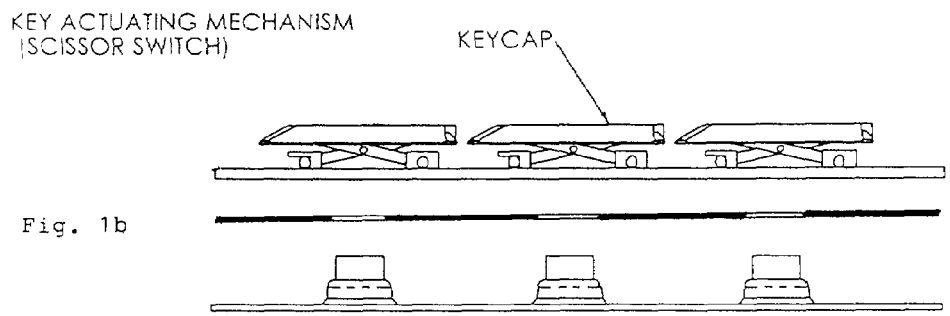
Fig. 1b
Fig. 1

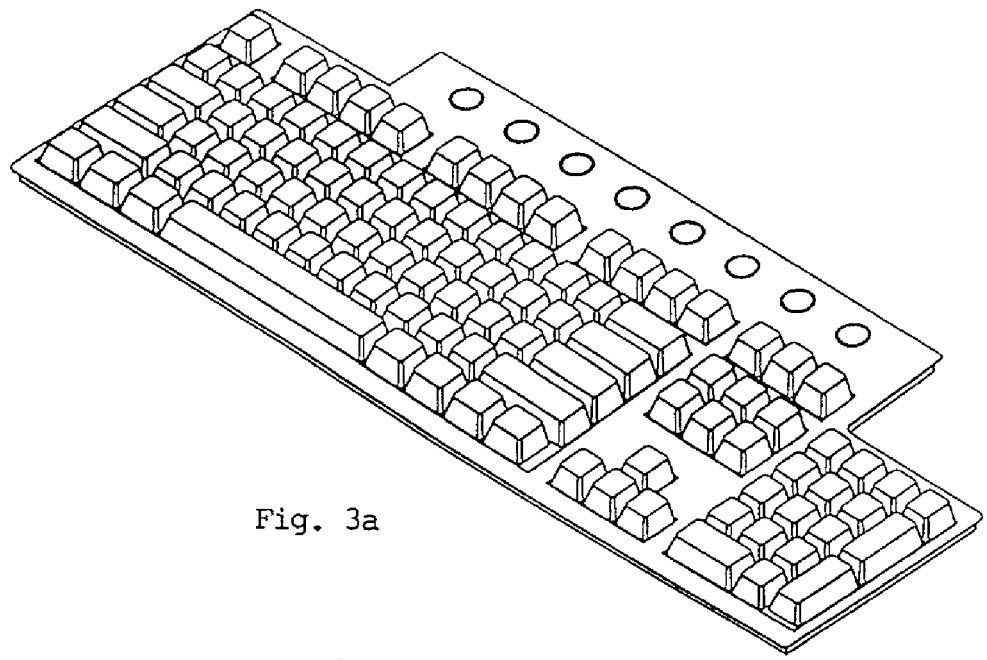
Fig. 3a
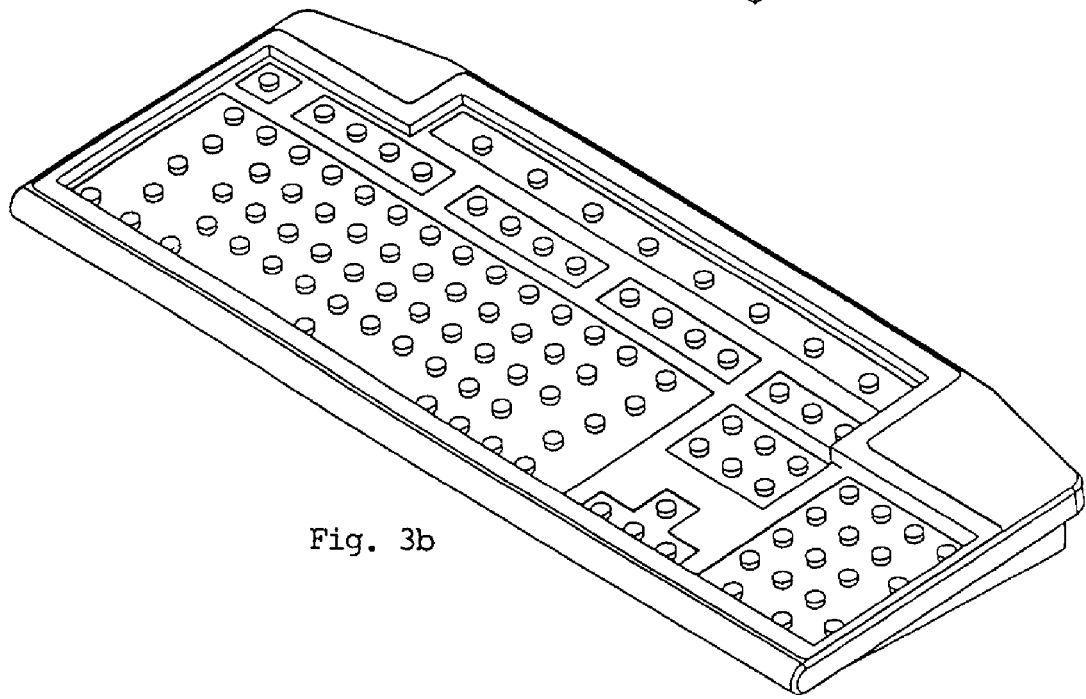
Fig. 3b
Fig. 3

METHOD OF ASSEMBLY FOR MODULAR COMPUTER KEYBOARDS

FIELD OF THE INVENTION

The present invention relates generally to the assembly method of keyboards for computers. More particularly, the present invention helps to solve the industry problems enumerated, but not limited by, below:

A. Voluminous amount of keyboards (for desktop computers) still under warranty are being returned for repair/exchange due to malfunctions that are user-serviceable. The amount of money that will be saved by avoiding such repair/exchange is estimated at least in the millions every year across the industry.

B. In the case of notebook or laptop computers, substantial amount of computers are being returned for simple malfunctions on the part of the keyboard which could have been easily serviced by consumers, had present invention been applied to the notebook computers. Costs associated with this kind of problems are estimated to be in the millions every year.

C. Substantially lesser amount of metal and rare metal contained in the keyboard will not become scrap metal causing environmental hazards some years down the road, as people are waking up to the potential hazards created by cast away computers, cell phones and other consumer electronics. Tremendous amount of money will be saved because of the reduced costs to cure the potential environmental hazards.

D. Cost of producing keyboards for different languages will be cut down to only a fraction thereof, because only a small portion of the keyboard needs to be replaced, not the whole keyboard.

E. Cost of tailoring keyboard for specific applications, as varied as computer gaming, hospital administration, diagnosis and sterilization afterwards, will be cut down to only a fraction thereof, because only a small portion of the keyboard needs to be replaced, not the whole keyboard.

BACKGROUND OF THE INVENTION

Modem day keyboards for desktop computers come in an integrated package, along with the computer system units when sold. Users can plug in the keyboard cord to a port at the back of the system unit and can then start to type on the keyboard when the desktop computer is working.

In the case of notebook or laptop computers, the keyboard is part of the computer system unit and cannot be separated from the system unit without disassembling the system unit.

Most desktop keyboards carry limited product warranty, on the condition that users do not take apart, disassemble or remove parts of keyboard in any way. The same restriction applies to keyboards for notebook computers. Any such action voids the product warranty. If the keyboard develops any malfunction, the only recourse under the warranty is to have it returned for repair or exchange. Some manufacturers have sticker(s) covering one or more screws used to fasten the keyboard parts together. Any breaking or removal of such sticker(s) will also void the warranty.

In today's technology, most keyboards have fairly high quality and durability. However, in the real-life working environment, desktop keyboards are destined to encounter some foreign objects that tend to cause problems, including, just to name a few, grease from fingers, liquid spillage, dusts and particles in the atmosphere. Without any means to clear the accumulated foreign matter away, inevitably the mechanical functionality of the keyboard is adversely affected.

Typical symptoms include, keycaps stuck in the holding chimneys by the accumulation of dried coffee, grease or dusts. Due to the "void the warranty" restriction, the only solution is to return the keyboard for repair service or in exchange for a new one. Since the keyboard industry in general does not factor in the cost of recycling keyboard components, the cost of sending out a new keyboard to users is lower than the labor cost of diagnosing, fixing and re-assembling a returned keyboard. Hundreds of thousands of returned keyboards gravitated towards storage bins, warehouses and even garbage dumps each year, while no one bothers to figure out how to make the best use of the re-useable resources and come up with a more environmentally sound solution to the problem.

Such return for service/exchange, for fear of voiding the warranty, can be remedied by the improved method of assembly described and presented in present application. The modular keyboard envisioned by present application thus will help the keyboard industry save millions of dollars every year, and is more in tune with the worldwide trend of deployment of environmentally sustainable technology.

DESCRIPTION OF THE PRIOR ART

The present invention examines the structure of a typical keyboard for modern day desktop and notebook computers, and proposes an improved method of assembling the keyboard components that helps to solve the industry problems.

Modem day keyboards for desktop computers are usually produced and assembled by using an upper and a lower enclosures (the outer shells for the finished keyboard product) to sandwich all internal components, which typically include keycap component, key-actuating mechanism, top holding plate, circuitry membrane and PCB, bottom holding plates/frame, and other optional components.

In the case of a notebook computer, keyboard is part of the system unit, and the internal components are built onto the system unit without the enclosures.

From top to bottom (in the usual orientation of daily usage), these typical internal components (excluding the top/bottom enclosures) are listed and explained below: (Please reference FIG. 1 and FIG. 2a, where separate groupings of components will be explained later in the specification)

1. keycap component: includes the following typical sub-components:
   a. individual keycap with alpha-numeric characters and other control keys for any specific language. The surface of each keycap, printed or labeled with character(s) for visual identification, is for human fingers to type on.
   b. holding mechanism to provide for the vertical up-down travel of each keycap when pressed down and then popped back.
   c. frame for the holding mechanism to sit on. In today's manufacturing process, the frame and the holding mechanism is usually an integrated structural piece.

2. top holding plate: optional, serves to hold down the key actuating mechanism and protect the components beneath.

3. key actuating mechanism: provides resistance and position restoration for each keycap. There are some variations as to the type of mechanism used for keyboard, to name a few:

a. Rubber dome (sheet): most common today, which uses dome-shaped material corresponding to each keycap.
b. Coil spring: vertical placement of coil springs along the up-down travel of each keycap, common for earlier generation keyboards; classical way of providing resistance and position restoration for each keycap.
c. Scissors switch: scissors-like cross levers with coil-springs or rubber domes to provide resistance and position restoration. (Please reference FIG. 1b)
d. Flexible metal plate.
e. Buttons formed by sealed air bubbles on rubber or plastic material.

4. circuitry membrane and PCB: the combined circuitry membrane and PCB (printed circuitry board) electronically determine which of the keycap is being pressed down and send that information to the computer for further processing.

5. bottom holding plate: used to hold the previous components in place.

It is well known in the industry that these components are just typical, because a lot of variations exist due to different designs and manufacturing processes. For example, in earlier keyboard models, the coil springs (key actuating mechanism) are integrated with and became part of the keycap component.

FIG. 1 sums up the structural allocation of a typical keyboard for computers. As most people can experience and agree, these typical keyboards cannot be separated into two or more modules that can be physically removed, detached, replaced, swapped or serviced. For simplicity reason, FIG. 1 also serves as the first embodiment of present invention by the groupings of "top module assembly" and "bottom module assembly", as shown on the left side of FIG. 1a.

For ease of reference, and for further explanation of present invention, the term "top module assembly", aka "removable module" and "bottom module assembly", aka "base module" will be used. The definitions will be given in the later parts of the specification and as shown in FIG. 1.

OBJECT AND SUMMARY OF THE INVENTION

One object of present invention seeks to greatly reduce the costs of diagnosing, fixing and reassembling a returned keyboard, or exchange for a new one, when warranty still applies. In the case of notebook/laptop computers, present invention helps to reduce the costs of manufacturing and servicing, and will eventually trickle the benefit back to lowered sales prices.

A further object of present invention is to create a keyboard manufacturing technology that is environmentally friendly and is conducive to elimination of future environmental hazards.

A still further object of present invention is to allow and promote the use of swappable keycap modules to fit specific language used, typing pattern and different applications.

Present invention will allow the production of a new modular keyboard with removable, replaceable, swappable, interchangeable and user-serviceable modules.

BRIEF DESCRIPTION OF THE DRAWINGS

The accompanying drawings, which are incorporated in and constitute a part of this specification, illustrate the preferred embodiment of the invention and together with the description, serve to explain the principles of the invention. A brief description of the drawings is as follows:

FIG. 1 shows the typical components of a keyboard, especially for desktop computers. In a first embodiment of present invention, keycap, holding mechanism and frame for the holding mechanism are group into a "top module assembly", the rest of the keyboard components are grouped to a "bottom module assembly." See FIG. 1a.

FIG. 1b shows the key actuating mechanism employing the scissor switch/rubber dome combination. This type of combination is seen more on keyboards for notebook computers.

In FIG. 2c, upper enclosure remains part of the bottom module assembly.

FIG. 3 gives an exploded user view of a keyboard implemented by present invention. FIG. 3a corresponds to the top module assembly, which includes keycap component, key holding mechanism and frame. FIG. 3b corresponds to the bottom module assembly.

DETAILED DESCRIPTION OF THE PREFERRED EMBODIMENT

In FIG. 1, the typical components of a keyboard are shown. Terms "top module assembly" and "bottom module assembly" are used here and explained below.

Top module assembly are made up of (1) the individual keycaps, (2) holding mechanism to provide the vertical up-down travel of the keycaps, and (3) frame for the holding mechanism.

Bottom module assembly corresponds to the remaining components of a keyboard unit not belonging to the top module assembly. From top to bottom, the components will include top holding plate, key-actuating mechanism, circuitry membrane/PCB, and bottom holding plate.

Figure 2A:
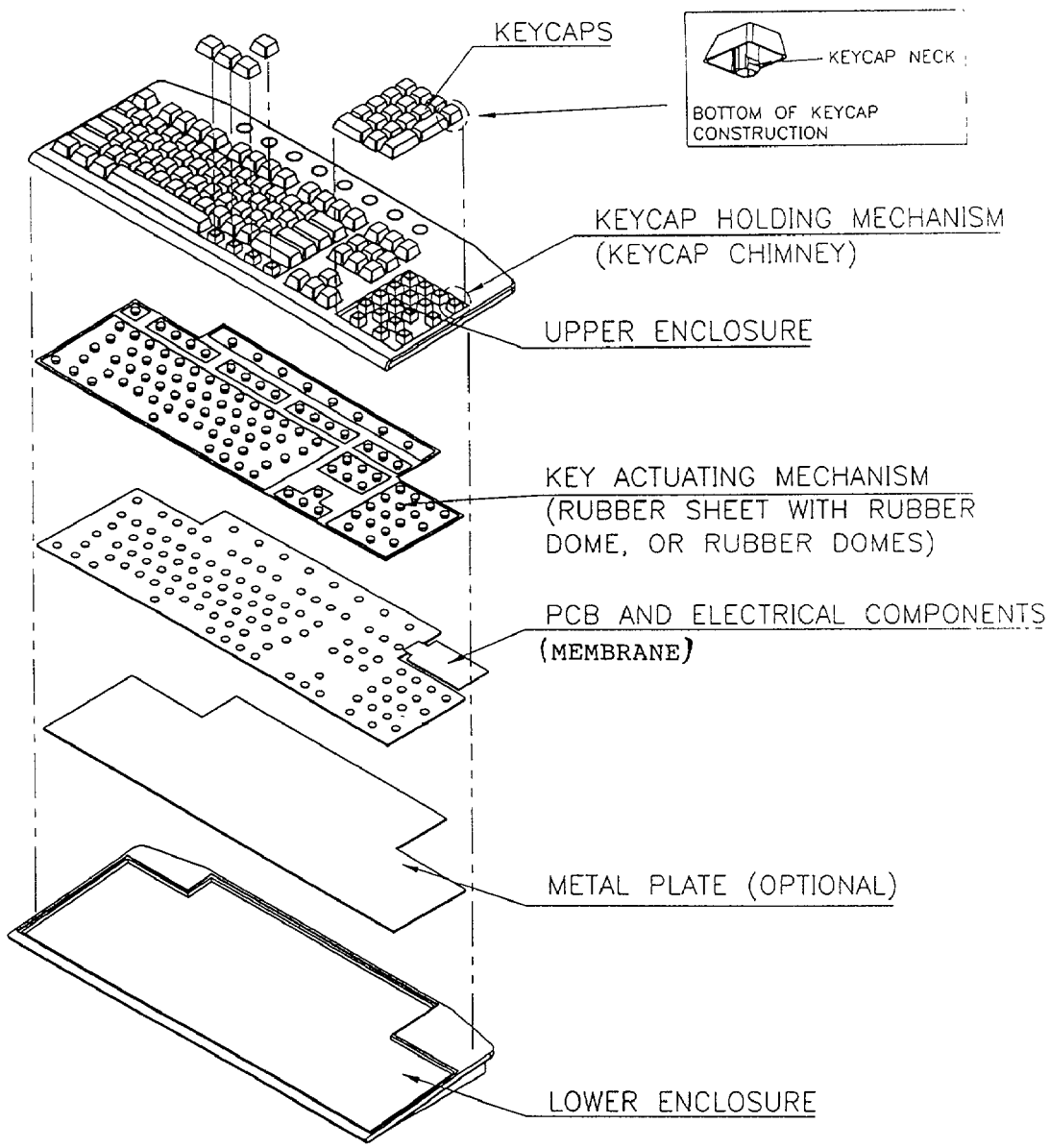
FIG. 2a shows the typical components of a keyboard, in an exploded view showing the separate components.
Figure 2B:
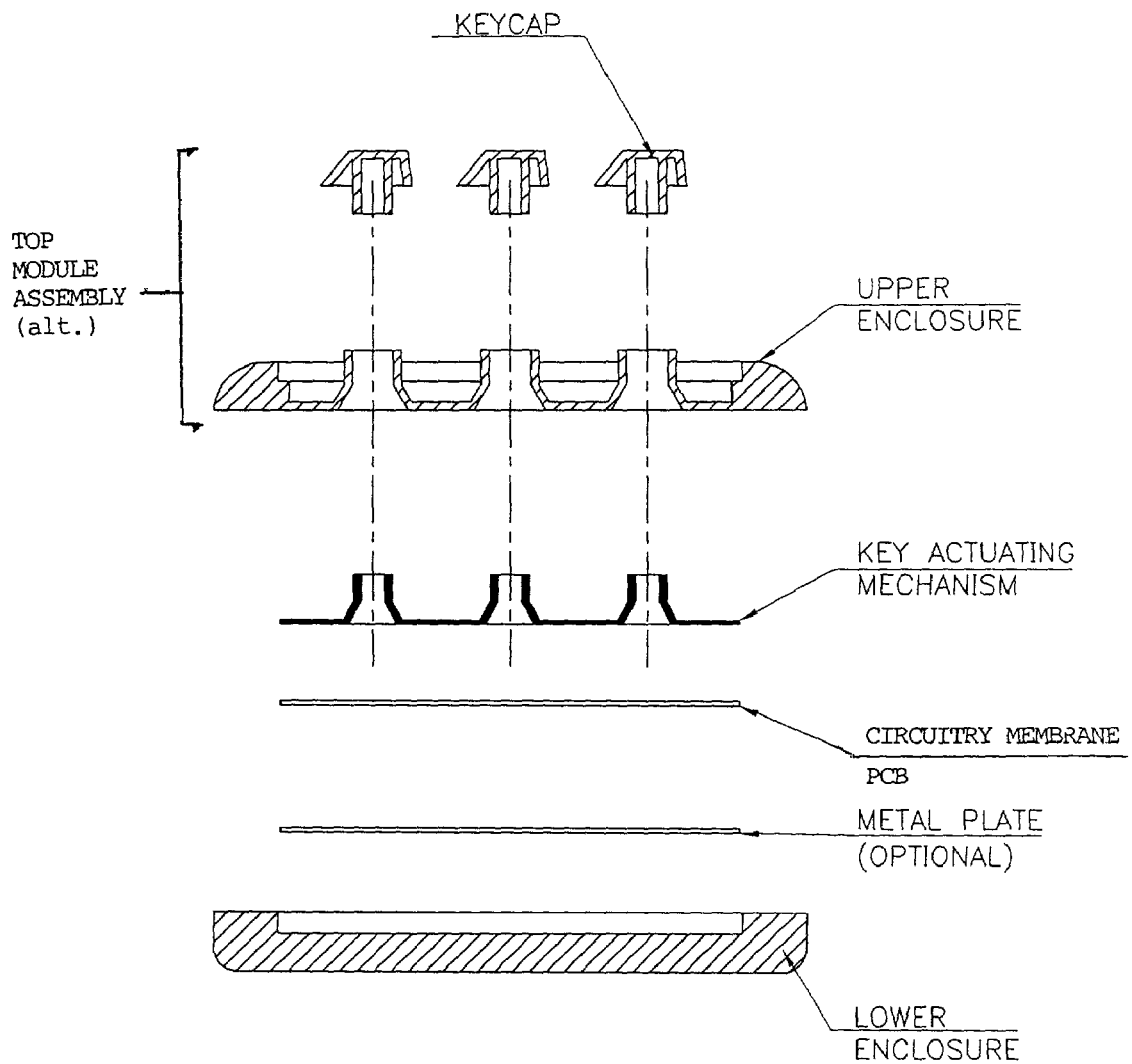
FIG. 2b shows an alternative design of keyboard by grouping upper enclosure into the removable module, aka top module assembly.
Figure 10:
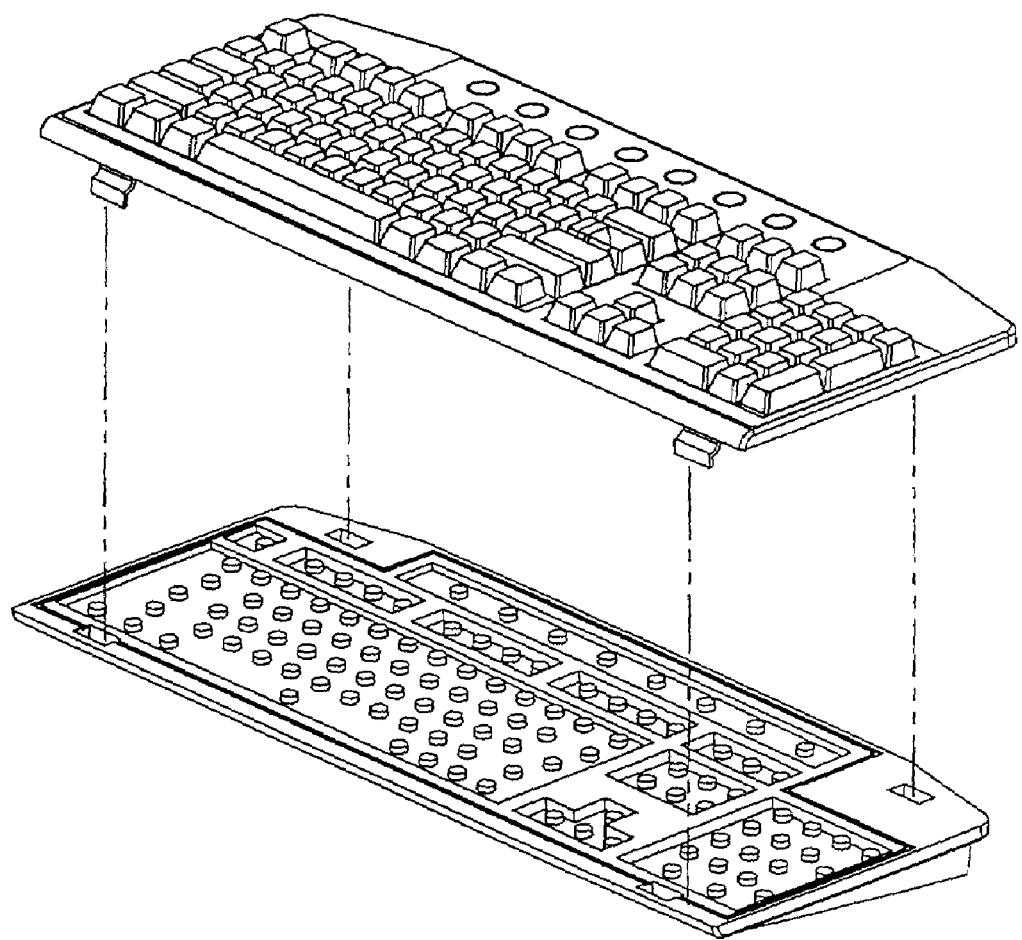
FIG. 10 shows the top module assembly can be mounted and secured to the bottom module assembly by yet another form of snap-in mechanism. In this drawing, upper enclosure is part of the top module assembly.
Figure 11:
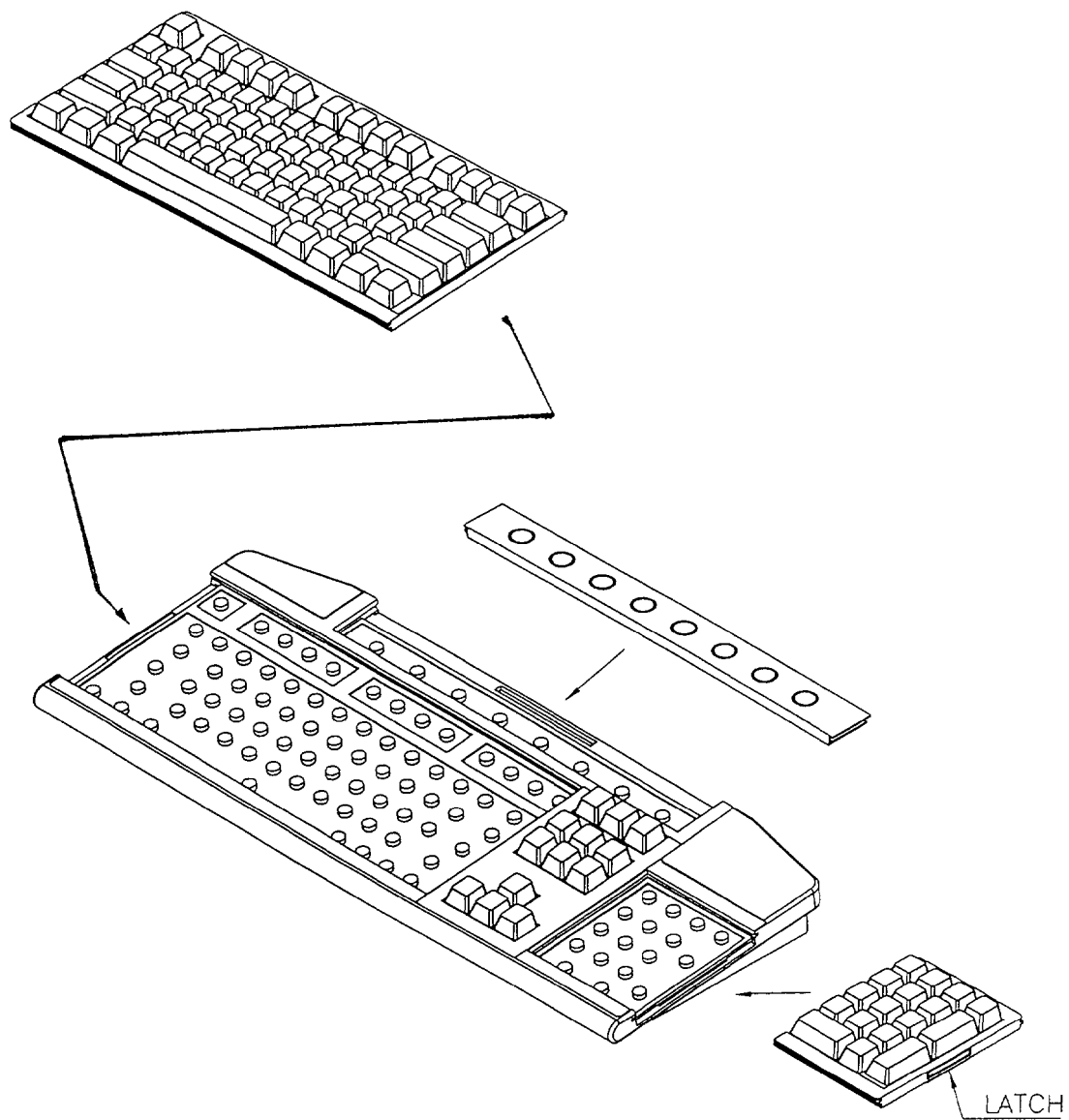
FIG. 11 shows the top module assembly can be mounted and secured to the bottom module assembly by employing a latch-hinge mechanism.
Figure 12:
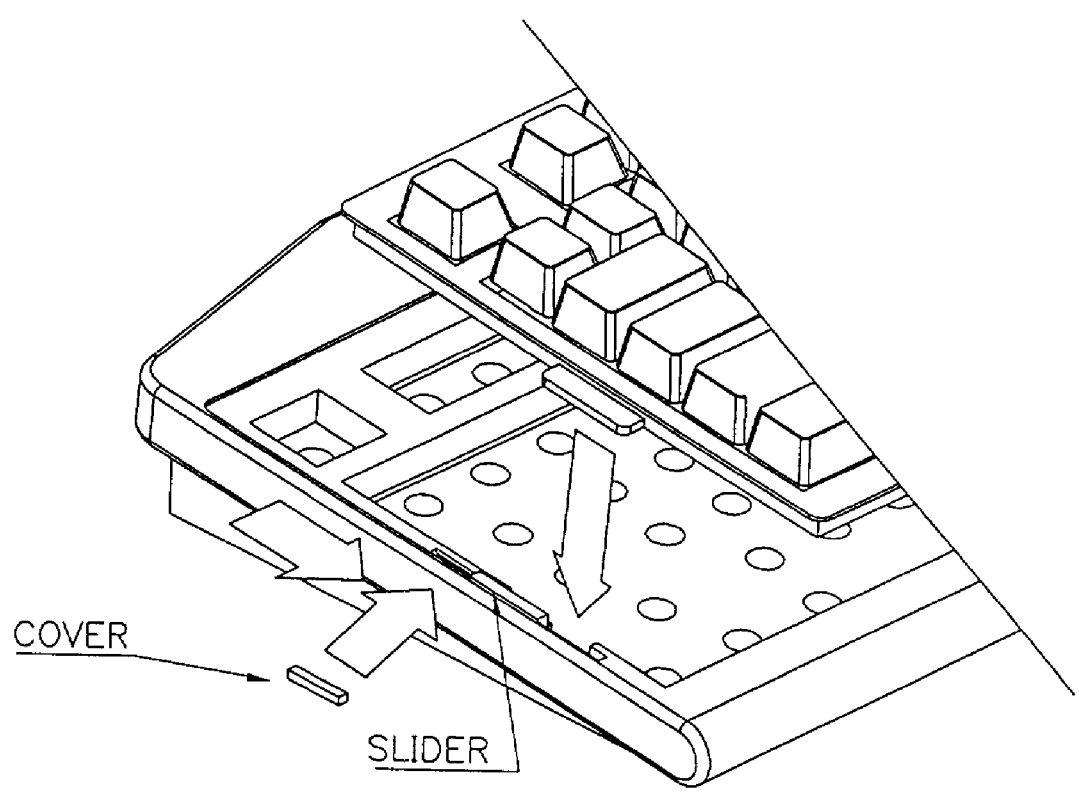
FIG. 12 shows the top module assembly can be mounted and secured to the bottom module assembly by employing tabs with holes extending from the sides of top module assembly, and corresponding cavities on the sides of the bottom module assembly with sliding locking pins to engage or disengage the tabs. The allocation of tabs/cavities can be reversed, that is, the tabs can be on the sides of the bottom module assembly, while the sliding locking pins are on the sides of the top module assembly.
Figure 13:
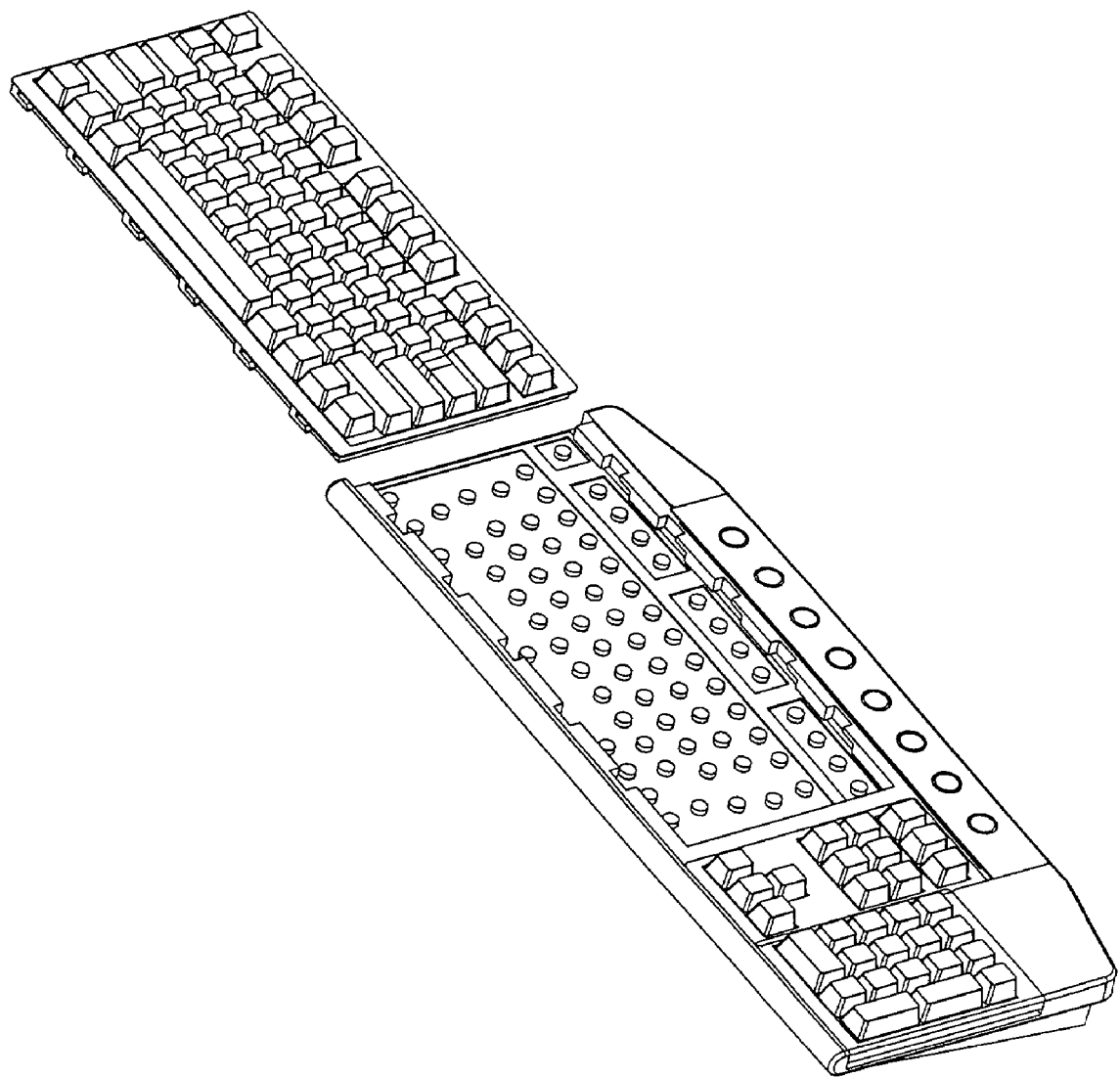
FIG. 13 shows the top module assembly can be mounted and secured to the bottom module assembly by horizontally sliding the top module assembly into the bottom module assembly. A number of tabs and hooks are used to engage and disengaged the top module assembly.

In one embodiment, present invention groups the upper enclosure and lower enclosure (the hard plastic casing of a keyboard, in the case of desktop computers) into the bottom module assembly, as shown in FIG. 1. In an alternative embodiment, upper enclosure can be grouped into top module assembly, as shown in FIG. 2b and FIG. 10.

In the case of notebook computers, the bottom module assembly of top holding plate, key-actuating mechanism, circuitry membrane/PCB and bottom holding plate would be built into the casing of the notebook computers; there will be no upper/lower enclosures.

Because the top module assembly contains the parts that are causing the malfunctions and the consequential return for repair/exchange, a keyboard assembled utilizing the method of present invention thus allows consumers to easily remove the top module assembly and wash it in clean water or appropriate solution, or spray common lubricant (WD-40, for example) and fix the problems.

Different design and manufacturing process oftentimes combine 2 or 3 components and make them into one. Alternatively, one component may be bifurcated into 2 or 3 components. As long as the variation, combination or bifurcation creates functional equivalents, the improved assembly method of present invention applies to achieve the objects and goals stated earlier. For example, bottom holding plate could be part of the circuitry membrane/PCB component. Or, the upper and lower enclosures could be only one integrated piece, instead of two pieces to be joined together by some mechanical means.

Depending on manufacture's design, alternatively, present invention envisions the possibility of including the upper enclosure into part of the top module assembly, as shown by FIG. 10, where snap-in tabs on the side of upper enclosure are employed to mount the top module assembly in place.

Figure 2C:
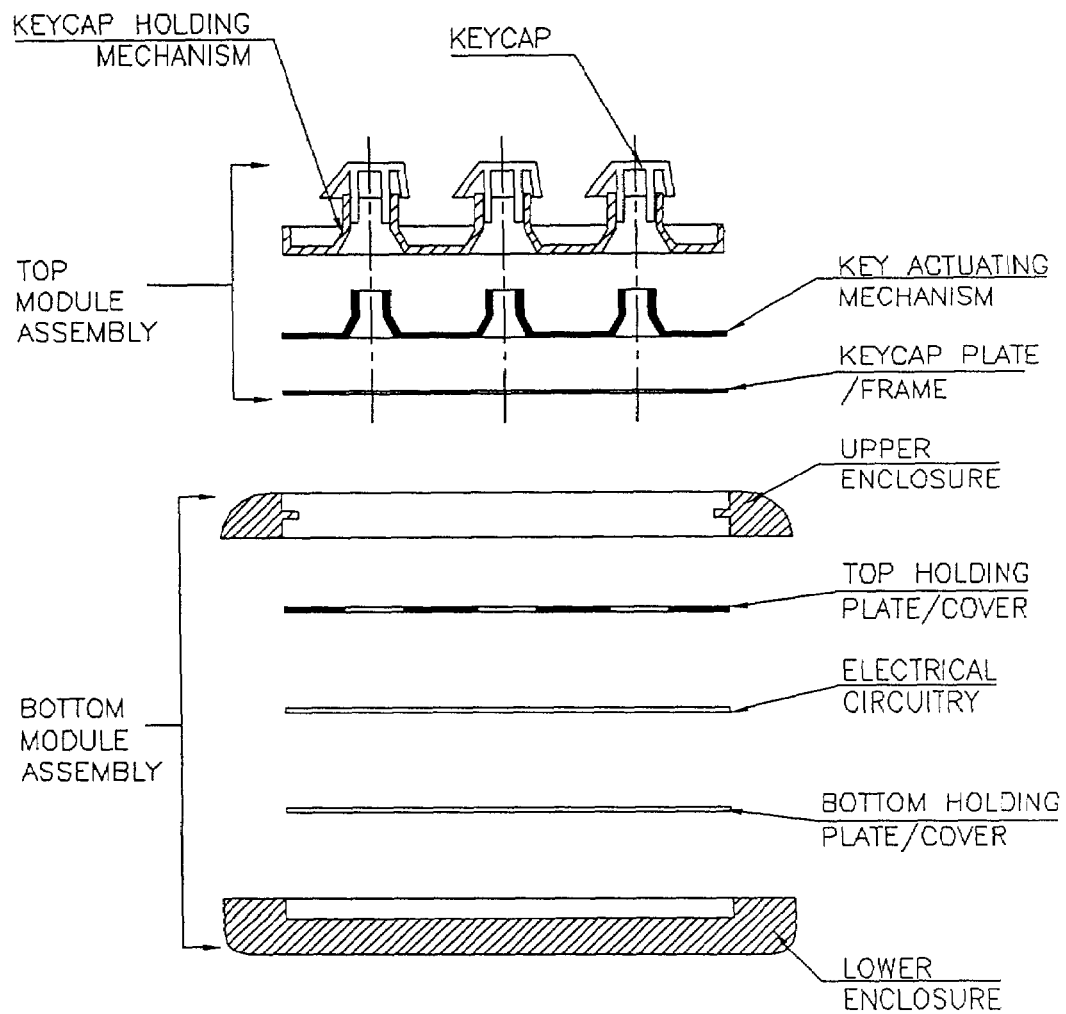
FIG. 2c shows an alternative design of keyboard by grouping key-actuating mechanism into the top module assembly. Depending on manufacturer's preference and other considerations, upper enclosure may or may not be grouped into top module assembly.
Figure 2D:
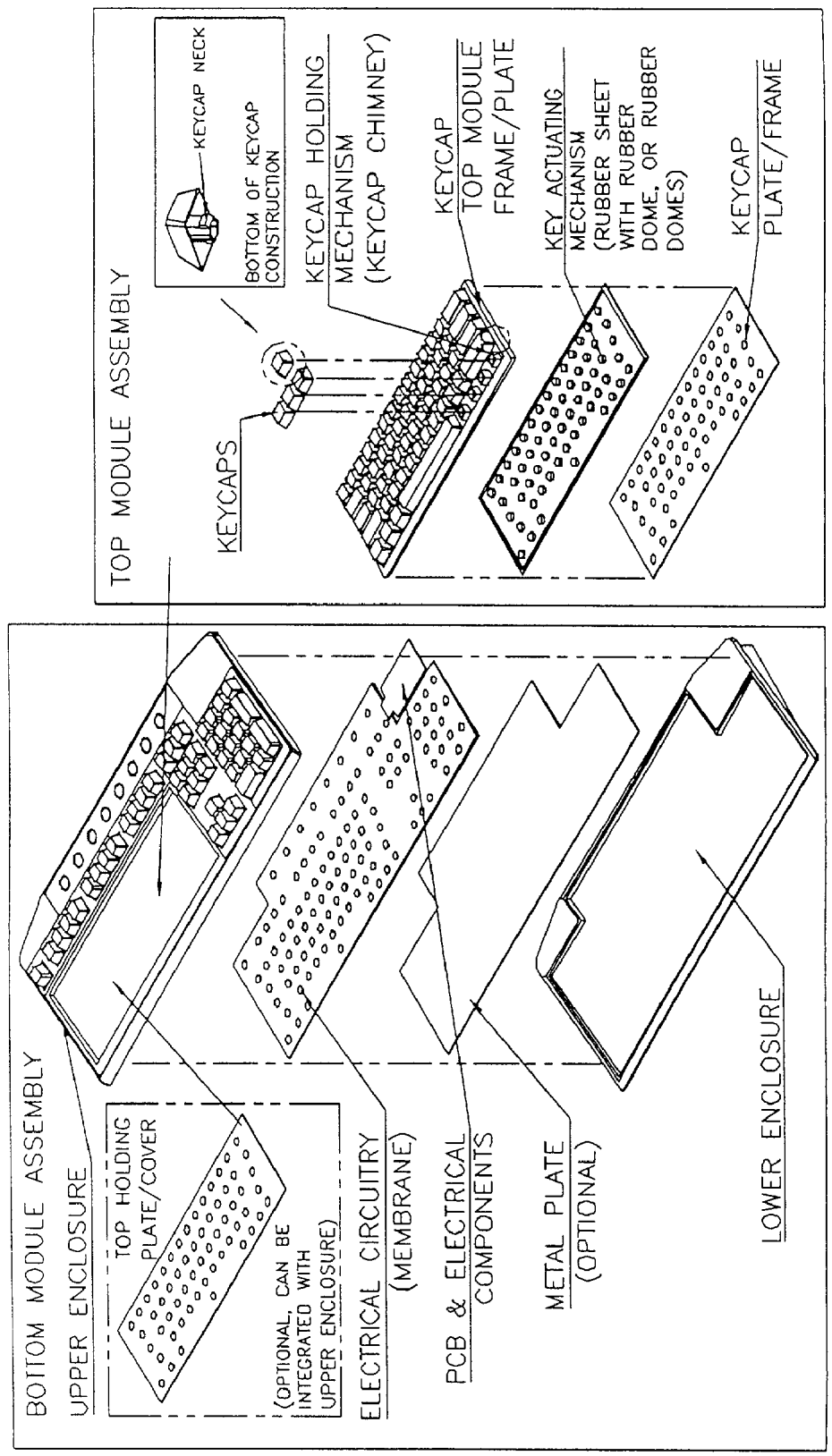
FIG. 2d shows yet another alternative design of keyboard by grouping a sub-keycap module to the top module assembly, along with its corresponding key-actuating mechanism. A keycap plate is used to secure the key-actuating mechanism to the keycap component. Other sub-keycap components (arrow keys and numeric keypad, for example) remain on the bottom module assembly.
Figures 4, 4A, 4B:
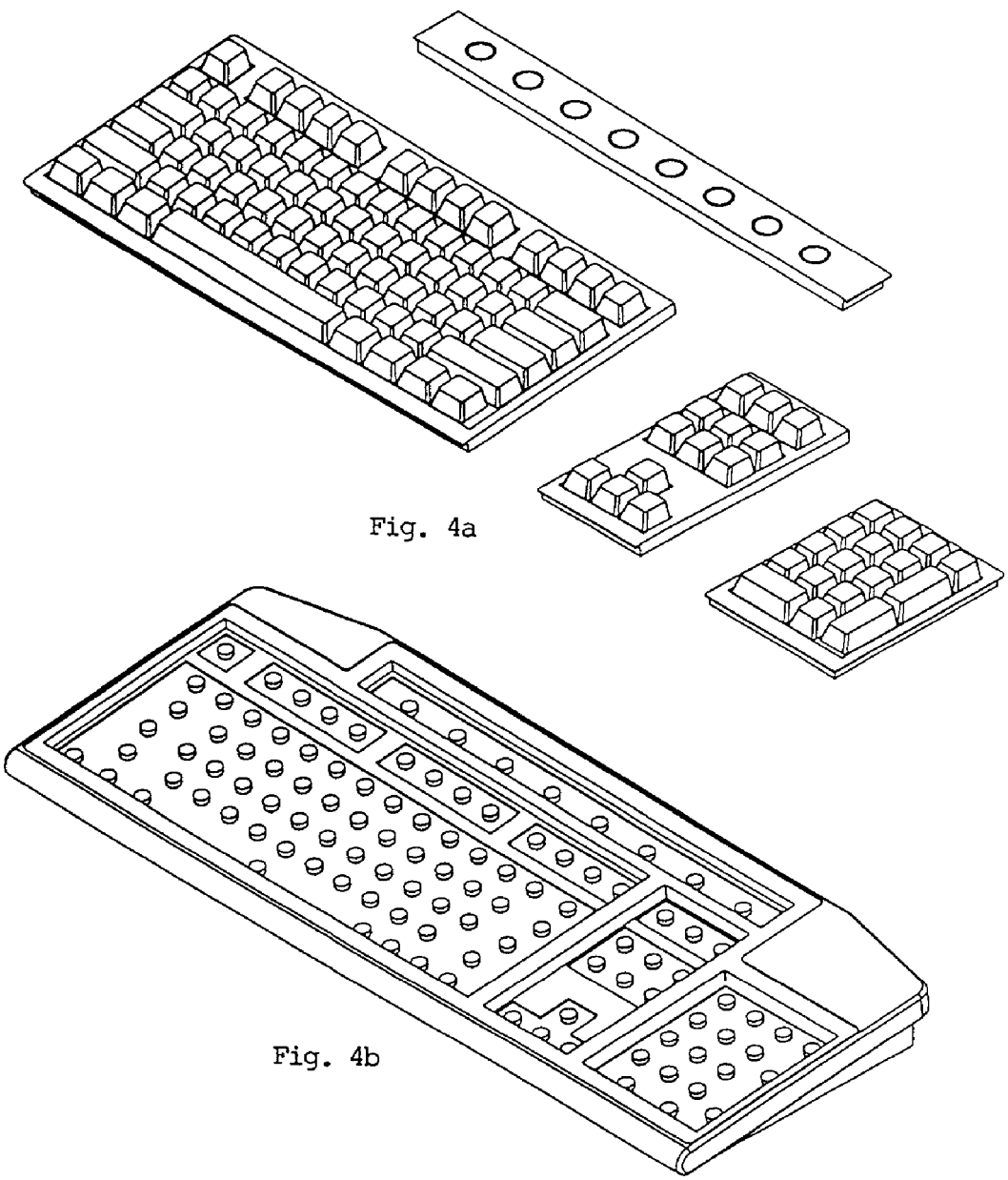
FIG. 4 gives an exploded user view of a keyboard implemented by present invention, wherein the top module assembly (removable module) of the keyboard can be broken into several sub-modules, while the bottom module assembly (base module) portion, containing the electrical circuitry, remains intact.
Figure 5:
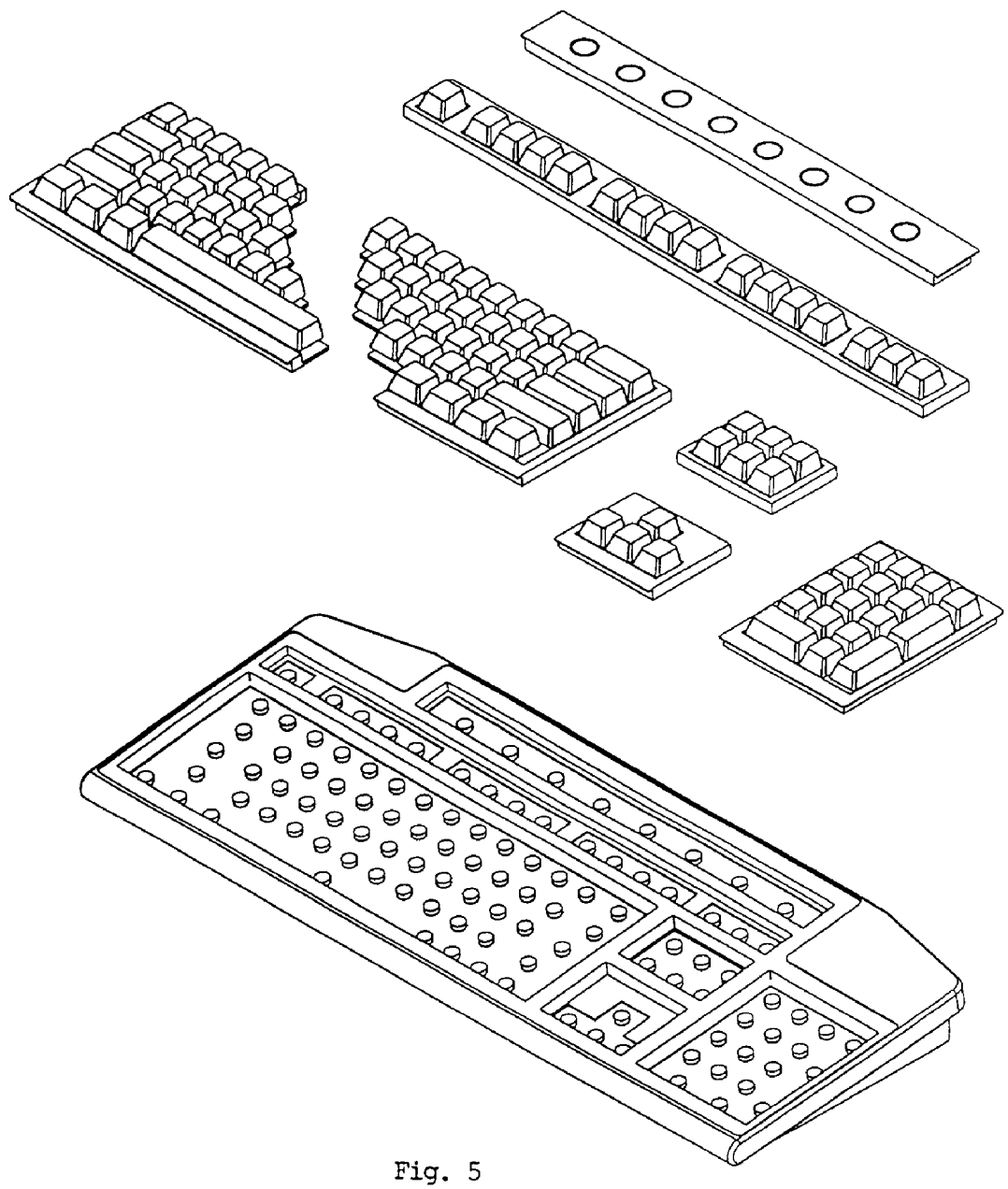
FIG. 5 gives an exploded user view of a keyboard implemented by present invention, wherein the top module assembly is further broken into more sub-modules, while the bottom module assembly (base module) portion, containing the electrical circuitry, remains intact.
Figure 6:
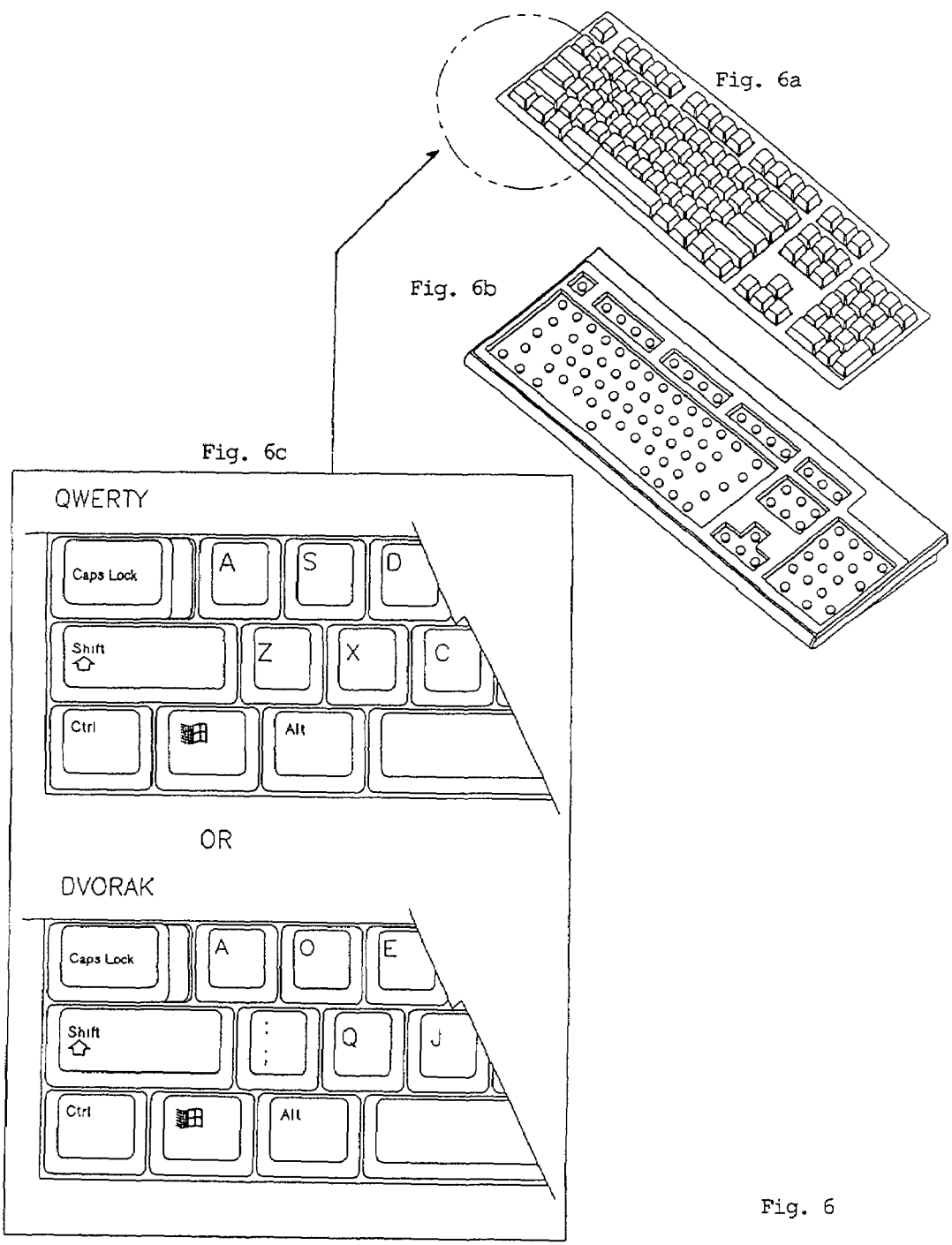
FIG. 6 shows how a QWERTY type keyboard can be turned to a DVORAK type keyboard, or vice versa, by fitting the desired top module assembly to the keyboard, while the bottom module assembly remains intact.
Figure 7:
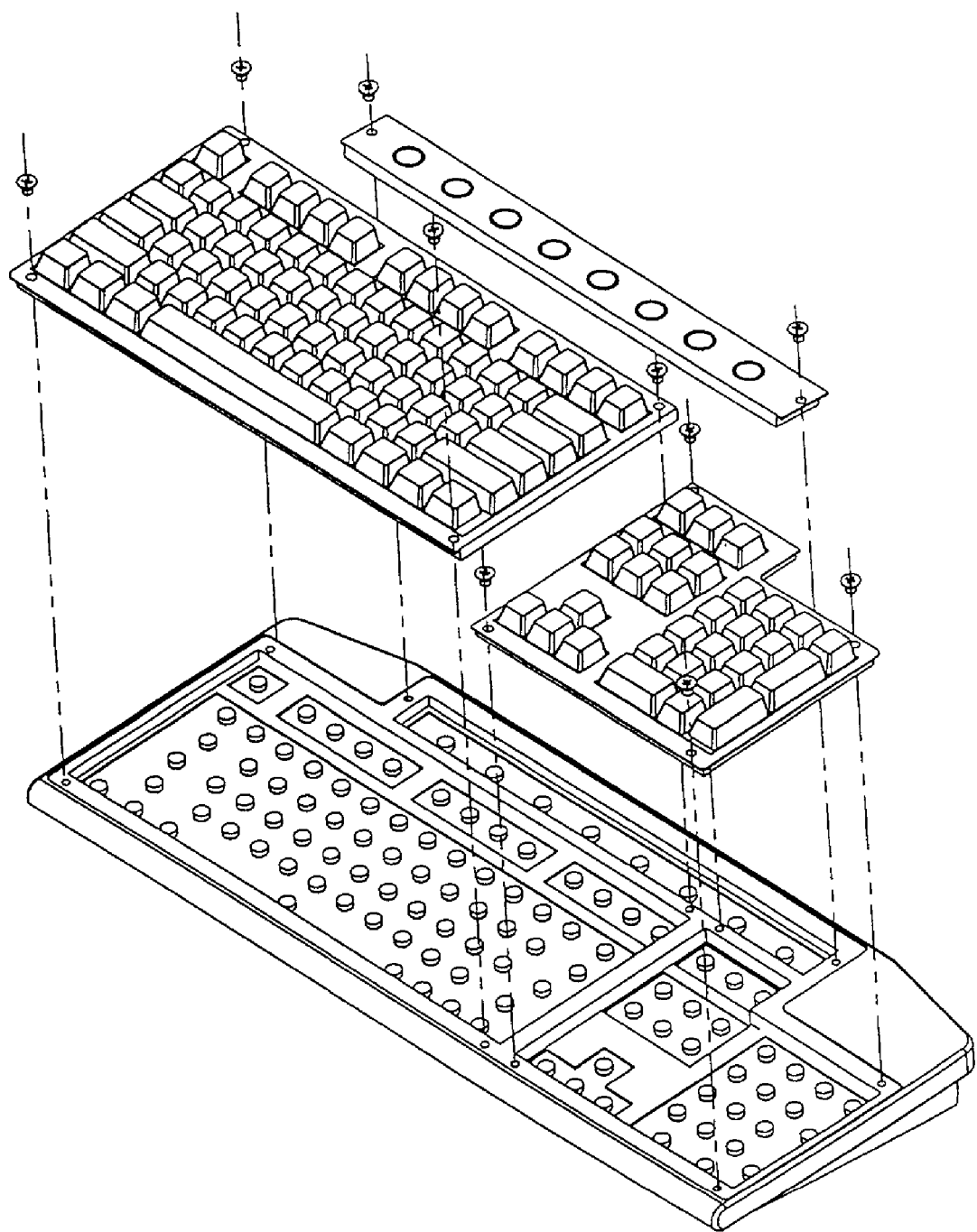
FIG. 7 shows the top module assembly can be mounted and secured to the bottom module assembly by screws in the top-down orientation.
Figure 8:
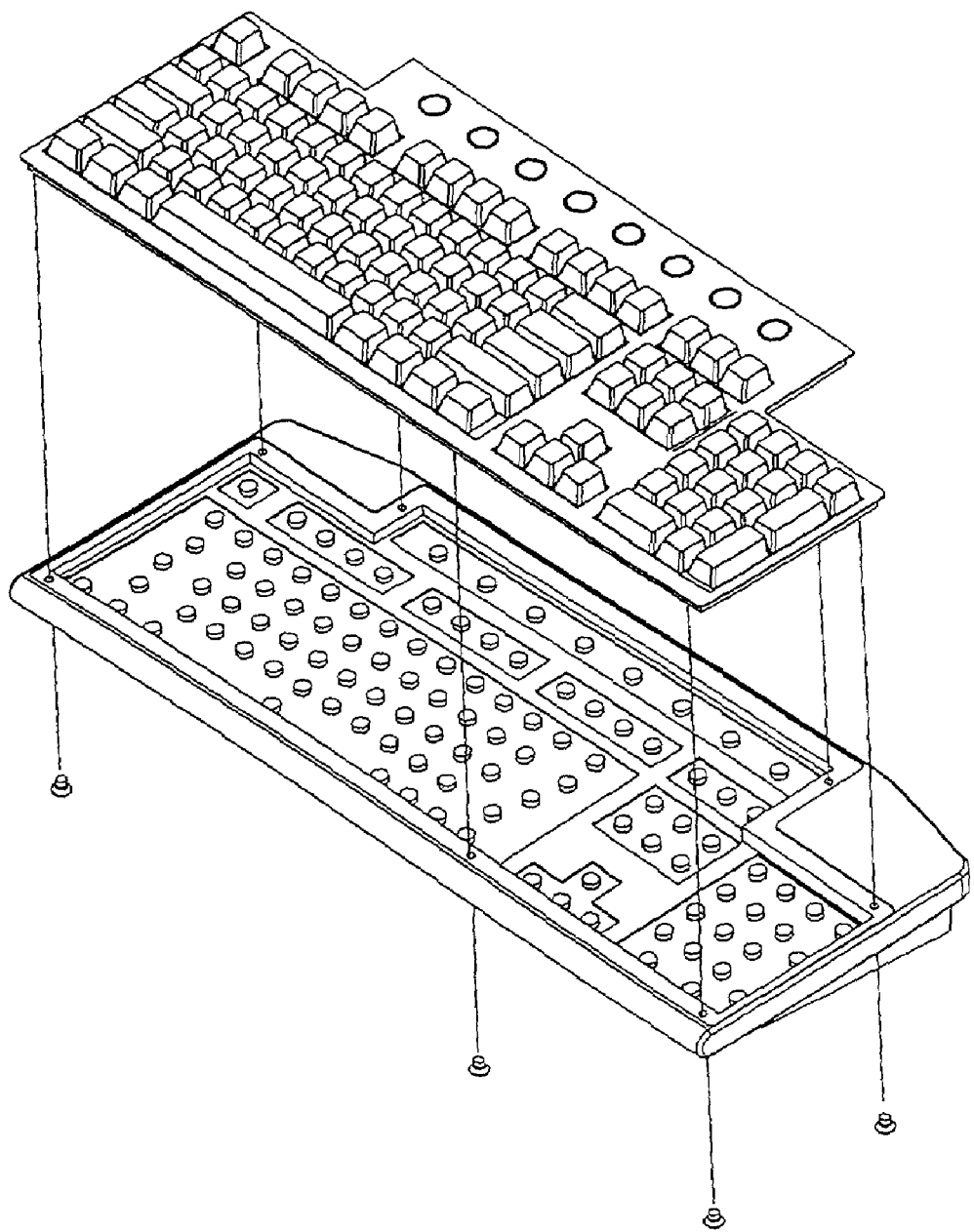
FIG. 8 shows the top module assembly can be mounted and secured to the bottom module assembly by screws in the bottom-up orientation.
Figure 9:
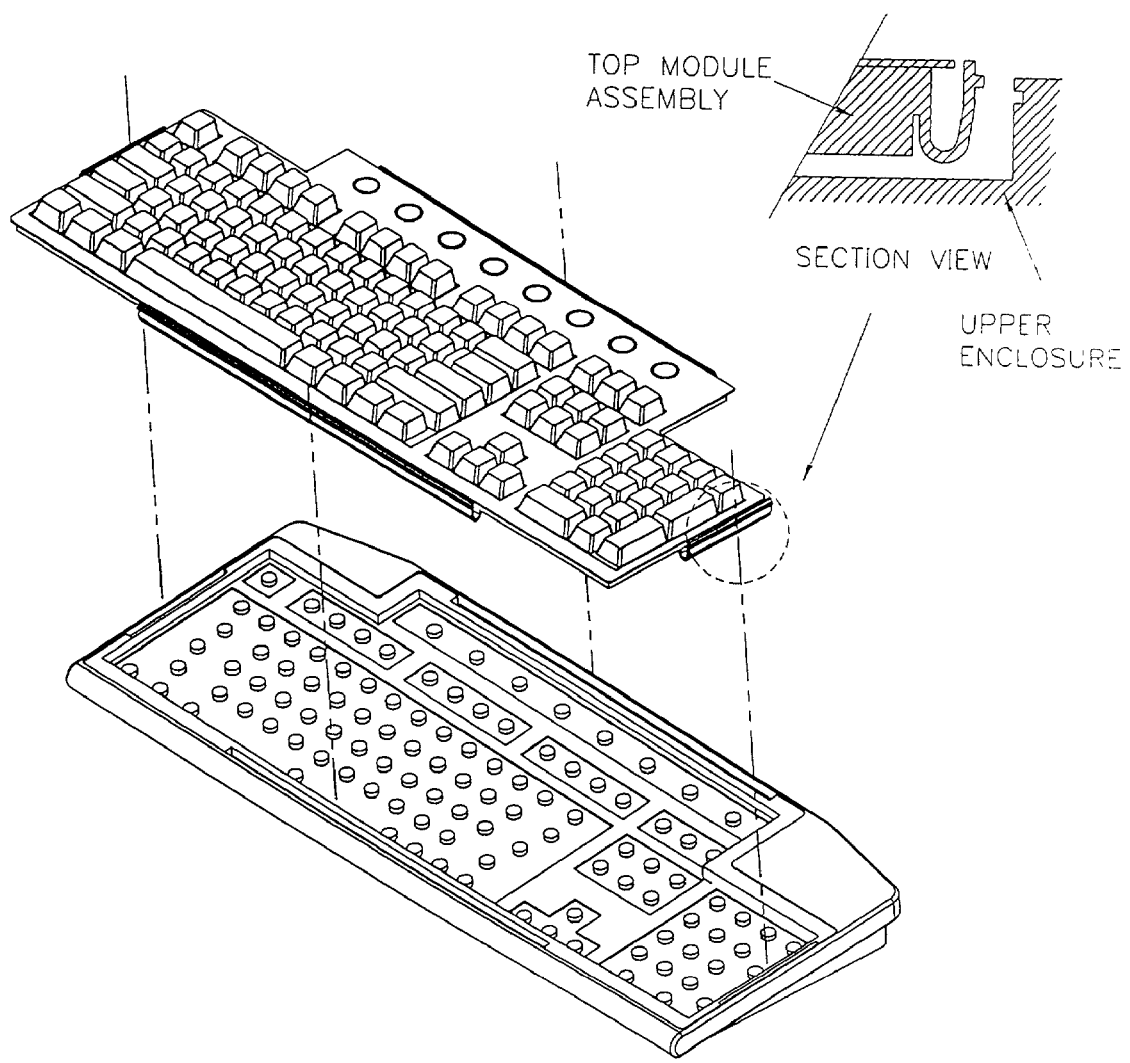
FIG. 9 shows the top module assembly can be mounted and secured to the bottom module assembly by snap-in tabs on the sides of the top module assembly to the grooves located on the sides of the bottom module assembly.

Present invention envisions yet another possibility of including the key-actuating mechanism into part of the top module assembly, as shown by FIGS. 2c and 2d.

What is claimed is:

1. A modular computer keyboard assembly, comprising:
    a top module, further comprising keycaps, keycap holding mechanism, frame for holding mechanism;
    a bottom module, further comprising key-actuating mechanism and printed circuit board, so that there is no electrical connection between said top module and said bottom module, and that said printed circuit board is encapsulated to prevent consumers from touching or doing any kind of servicing or repairing; and
    means for easy removal of said top module from said bottom module.

2. The keyboard assembly of claim 1, wherein said top module can be a single module or be broken into sub-modules.

3. The keyboard assembly of claim 2, wherein the placement of key actuating mechanism is in the top module, instead of the bottom module.

4. The keyboard assembly of claim 1, 2 or 3 wherein said means of easy removal is by one or a plurality of screws in the top-down orientation, so that a user can remove the top module by removing the screws and unseat the top module away from the bottom module.

5. The keyboard assembly of claim 1, 2 or 3, wherein said means of easy removal is by one or a plurality of snap-in tabs, so that a user can remove the top module by depressing said snap-in tabs from its engaged cavity and unseat the top module away from the bottom module.

6. The keyboard assembly of claim 1, 2 or 3, wherein said means of easy removal is by one or a plurality of latch-hinge mechanisms, so that a user can remove the top module by unlatching and unhinging the top module and unseat the top module away from the bottom module.

7. The keyboard assembly of claim 1, 2 or 3 wherein said means for easy removal is by one or a plurality of slidable locking pins corresponding to one or a plurality of tabs with holes on said top module, so that a user can remove the top module by sliding the pins to disengage the slide-lock and unseat the top module away from the bottom module.

8. The keyboard assembly of claim 1, 2 or 3, wherein said means for easy removal is by one or a plurality of tab-like hooks, so that a user can remove the top module by slightly prying away the hooks and unseat the top module away from the bottom module.

* * * * *